United States Patent [19]

Chap

[11] Patent Number: 4,666,201
[45] Date of Patent: May 19, 1987

[54] MODULAR WRAP ORGANIZER

[75] Inventor: John P. Chap, Lemont, Ill.

[73] Assignee: Selfix, Inc., Chicago, Ill.

[21] Appl. No.: 789,746

[22] Filed: Oct. 21, 1985

[51] Int. Cl.$^4$ ............................................. A47F 5/08
[52] U.S. Cl. .................................. 294/161; 211/119;
 211/126; 108/64
[58] Field of Search ................ 294/161; 211/119, 126,
 211/134, 194, 120, 188, 184; 206/511, 513;
 220/19; 108/64

[56] References Cited

U.S. PATENT DOCUMENTS

| | | | |
|---|---|---|---|
| 3,208,406 | 9/1965 | Maslow | 108/64 |
| 3,606,949 | 9/1971 | Joyce | 294/161 |
| 4,387,811 | 6/1983 | Ragir et al. | 211/119 |
| 4,456,125 | 6/1984 | Chap | 211/126 |

Primary Examiner—James B. Marbert
Attorney, Agent, or Firm—Dressler, Goldsmith, Shore, Sutker & Milnamow, Ltd.

[57] ABSTRACT

A modular article supporting rack has a U-shaped supporting frame. A plurality of elongated, transversely extending, shelves, formed of wire members, is affixed to the sides of the supporting frame. Each of the rack modules is stackable for shipping and storage. Each rack module may be attached to a second identical module to form a rack having twice as many shelves. Each shelf is formed of a C-shaped, wire, shelf frame member with a package retaining lip formed in a central region thereof. A plurality of elongated shelf-support wire members can be affixed, spaced apart from one another, to the sides of the C-shaped, shelf frame member to complete each shelf.

3 Claims, 4 Drawing Figures

MODULAR WRAP ORGANIZER

FIELD OF THE INVENTION

The present invention pertains to plastic-coated wire convenience racks. More particularly, the present invention pertains to modular racks configured for storing various types of wrapping materials.

BACKGROUND OF THE INVENTION

Racks and baskets formed from plastic-coated metal wire have become very popular consumer items. These products are available as shelves, racks and baskets which facilitate convenient storage of articles as desired. The use of plastic coating in connection with these types of products provides for an attractive, durable and corrosion resistant finish. These products can thus be used not only in kitchen and bathroom areas but also throughout the house. Baskets or racks formed of coated wire material have proven particularly useful. These types of products include interconnected coated wire members which define baskets of various shapes. The fronts of such baskets are usually open to facilitate the placement and removal of articles into and from the basket.

For example, coated stackable shelf units are disclosed in U.S. Pat. No. 4,444,320 entitled STACKABLE SHELF UNIT. Hangable, stackable basket units are disclosed in U.S. Pat. No. 4,456,125 entitled HANGABLE, STACKABLE BASKET.

Baskets and racks so formed may be configured so as to facilitate easy mounting thereof. The versatility of such racks can be further enhanced when two or more racks can be used in connection with one another. A further desirable feature is nestability which permits compact storage of a group of racks during shipment, storage and when on display.

One class of articles that has a characteristic, elongated shape, is that of wrapping materials. These include foils, plastic wraps and plastic bags. These items have become very popular with consumers. They tend to be stored in or near the kitchen. Very often they are found stacked one on top of the other on a pantry shelf.

A known free standing rack usable with wrapping materials has been formed of plastic covered wire. This rack has a central support frame with elongated transversed extending shelves. The shelves are fixedly attached and extend from both sides of the frame. Each shelf includes a high package retaining lip. The lip in the known rack is about one inch high. As a result, articles cannot be removed transversely off of a shelf. Rather, the articles can only be removed from an end of a shelf. This results in a substantial limitation on the ease of use and convenience of the known rack.

Heretofore, no known wrapper rack arrangements have been configured which provide all of the above-desired features including nestability, and modularity. In addition, the known wrapper racks are not suitable for both panel mounting or free standing usage.

SUMMARY OF THE INVENTION

In accordance with the invention, a modular wrapper organizing rack is provided. A modular, wrapper organizing rack which embodies the invention has a U-shaped supporting member to which is attached a plurality of elongated transversely extending shelves. Each of the shelves extends essentially perpendicularly out from the U-shaped supporting member. Each of the shelves is a formed wire member and includes a package or article retaining lip which is formed on an elongated side of the shelf.

The rack module can be used by itself to removably support a plurality of packages. The packages can be removed by withdrawing them from an end of a shelf or by withdrawing them transversely over the package retaining lip. The modular rack has the advantage that the wrapper materials are not stacked on top of each other. Rather, they are supported in spaced apart relationship, with respect to one another. Hence, the lower-most wrapping item is as easily removable from the modular rack as is the upper-most item.

A rack module can be affixed to a panel, such as a pantry door. The same rack can be placed on a shelf or counter and used as a free-standing convenience item. Alternately, two rack modules can be placed back-to-back with corresponding U-shaped supporting members adjacent one another. The two racks together can be attached to form a single double sided, free-standing, rack with twice as many shelves.

The rack modules are nestable and a plurality of them may be nested together for shipping and storage purposes. Each of the rack modules can be formed out of coated wire.

Each of the shelves can be formed with a C-shaped transversely extending wire member. The package retaining lip can be formed as part of the elongated central section of the C-shaped wire member. A plurality of elongated wire shelf-filler members can be affixed between the short sides of the C-shaped member. These shelf-filler members are affixed to the C-shaped member, spaced apart from one another, and extend essentially parallel to the adjacent package retaining lip.

A handle can be formed in a central region of each of the U-shaped supporting members. The handle can be used for carrying the modular rack or for carrying a coupled pair of modular racks.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
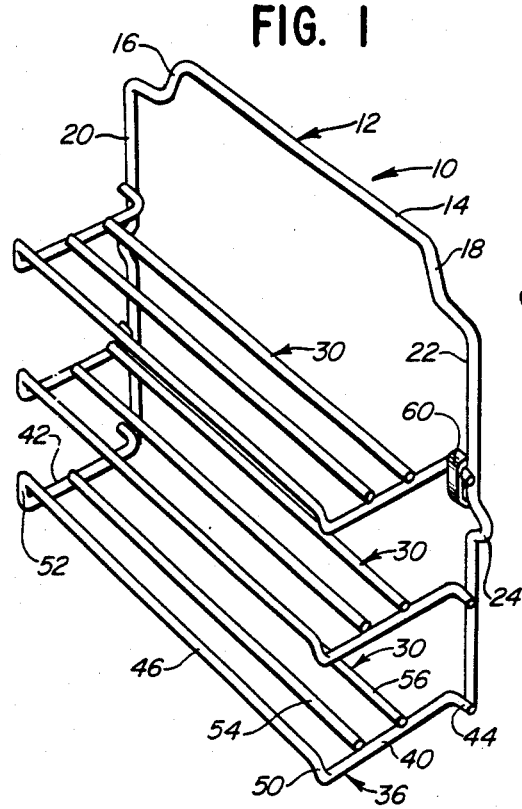
FIG. 1 is a perspective view of a rack module in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

With reference to FIG. 1, a rack module 10 in accordance with the present invention is illustrated. The rack module 10 includes a generally U-shaped frame or supporting member 12. The frame 12 includes an elongated handle section 14 which is offset by two bias members 16 and 18. The bias members 16 and 18 connect the elongated handle portion 14 to elongated support elements 20 and 22, respectively. In normal use, the rack modular 10 is oriented with the handle 14 essentially horizontal and the support members 20 and 22 essentially vertical.

Each of the support members 20 and 22 is a linear, elongated member with a stabilizing and strengthening eyelet or tab such as the eyelet or tab 24 formed therein. The eyelet 24 can also be used to receive a screw if it is desired to mount the unit 10 on a panel or interior of a door. In this installation, the U-shaped frame 12 is pressed against the panel or door by the screws. The position along the member such as 20 or 22 of the eyelet or tab 24 is selected to provide for a stable retention of the rack 10 on a panel or a door.

The U-shaped frame 12 having the handle section 14 and the two supporting members 20 and 22 provides a structure from which the remainder of the rack module hangs and is supported. The rack 10 further includes a plurality of elongated, wire shelves such as the shelves 30. Each of the shelves extends transversely from the U-shaped frame 12.

Each of the shelves 30 is identical. The exact number of shelves and their relative location with respect to one another is not a limitation of the present invention.

Each of the shelves 30 is formed with a generally C-shaped wire frame member 36. The wire frame member 36 includes relatively short, spaced apart, first and second, side members 40 and 42. The side members 40 and 42 are each attached by outwardly extending tabs 44, to the respective support members 20 and 22. The tabs 44 can be attached to the respective support member by welding, soldering, braising, adhesive or in any other manner which will rigidly interconnect each of the shelves, such as the shelf 30 to the U-shaped wire frame 12. Each of the shelves 36 is oriented essentially perpendicular to the U-shaped member 12.

Because the tabs 44 are outwardly, extending as can be seen in FIG. 1, each of the shelves 30 is somewhat shorter than the spacing between the members 20 and 22. As a result, a plurality of rack modules 10 can be nested together for storage and shipping.

The short side members 40 and 42 are joined by an elongated, laterally extending, package retaining lip 46. The lip 46 is raised or offset vertically from the members 40 and 42 by bias members 50 and 52. In a preferred embodiment of the invention, the offset is on the order of one-half inch.

The package retaining lip 46 will inhibit a box or a container of wrapping material from sliding transversely off the shelf member 30 if the rack module 10 is mounted on a movable panel such as a door. A further advantage of the rack module 10 lies in the fact that the shelves 30 are spaced apart from one another such that a container of wrapping material may be removed transversely over the retaining lip 46 or at a end, over the member 40. Being able to insert articles into the rack 10 or remove same from the rack 10 from either direction improves the usability and convenience of the rack.

An additional advantage of the rack module 10 is that the shelves 30 independently support the wrapper items in essentially vertical any spaced apart relationship. Hence, the items on shelf may be removed and inserted as easily as the items on any other shelf.

Each of the shelves 30 is strengthened by two, spaced-apart, elongated, linear, article support members 54 and 56. The article support members 54 and 56 are respectively affixed to the side members 40 and 42. More or less support members could be added to the shelf 30 without departing from the spirit and scope of the invention. In addition, the shelves 30 need not all be identical.

A friction clip 60 is attached to one or more of the shelf-affixing tabs 44. Advantages and uses of the clip 60 will become apparent subsequently.

Figure 2:
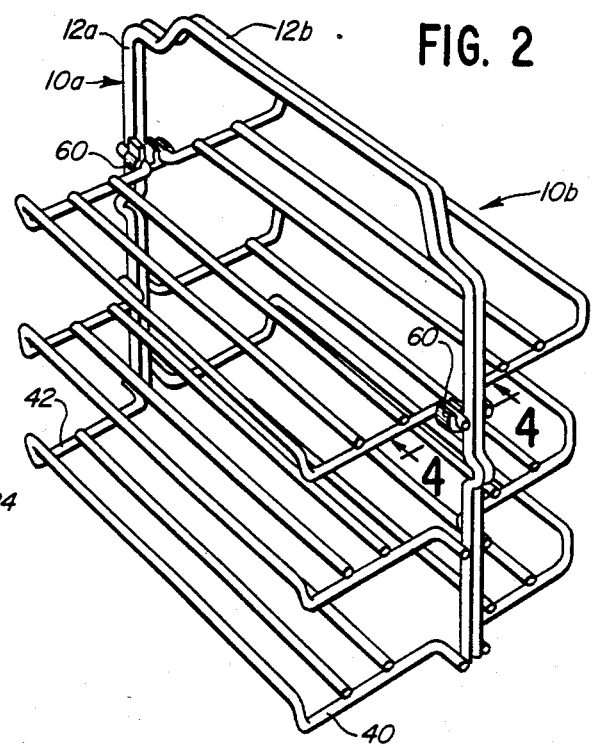
FIG. 2 is a perspective view of a pair of interconnected rack modules in accordance with the present invention.

FIG. 2 illustrates the use of two identical rack modules 10 in combination. In the configuration of FIG. 2, the two rack modules, identified as 10a and 10b have been placed back-to-back with their respective U-shaped frames 12a and 12b adjacent one another. A pair of friction clips 60 is used to lock the two rack modules 10a and 10b together.

The advantage of being able to interconnect the rack modules 10 as in FIG. 2 lies in the fact that the resultant two module unit is stable, free-standing and provides twice as much shelf space for wrapper storage as does the basic rack module 10. The dual rack configuration of FIG. 2 can be placed on a shelf in a pantry. Since the dual rack configuration is stable and free-standing, it can also be removed from the pantry shelf and placed on a counter for easy access.

Figure 3:
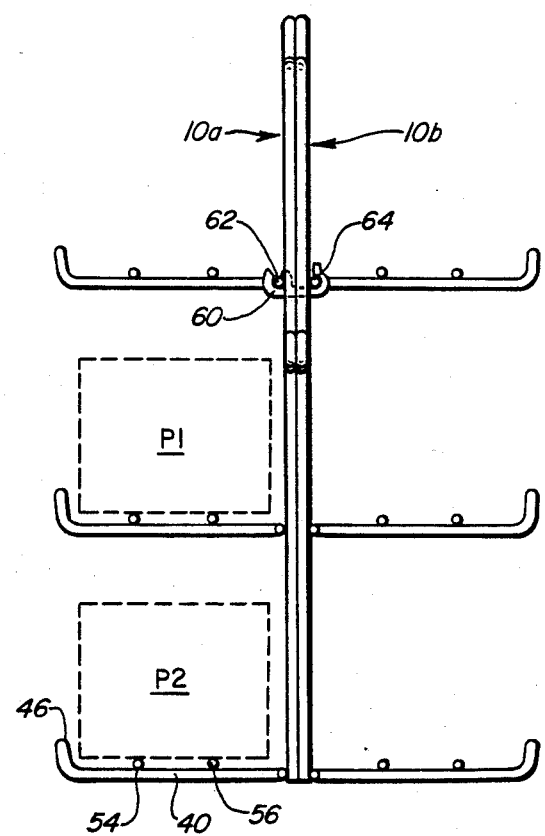
FIG. 3 is an elevational end view of the interconnected rack modules of FIG. 2.

FIG. 3 illustrates the relative positioning of the two rack modules 10a and 10b with respect to each other. The friction clip 60 can clearly be seen attached to two tab members 62, 64 in FIG. 3 locking the rack modules together. Also, as can be seen in FIG. 3, article or package P1, shown in phantom, is supported independently of article or package P2 also shown in phantom. Packages P1 or P2 can be removed from the end of the rack 10, over the short, side members 40 or alternately, over the package retaining lip 46.

Figure 4:
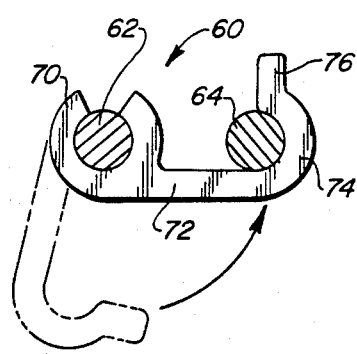
FIG. 4 is a sectional view taken along a plane defined by line 4—4 of FIG. 2.

Each rack module 10 includes the friction clip 60 illustrated in detail in FIG. 4. The clip 60 includes a curved grasping end 70 designed to rotatably clamp onto a wire tab, such as the wire tab 62 of a selected shelf. The curved end 70 is integrally formed with a middle linear region 72 which terminates in a flexible hook member 74. The hook member 74 has a releasing end 76 formed thereon.

The hook member 74 is designed to releasably engage an adjacent tab, such as the tab 64. When two rack modules are placed adjacent one another, as in FIG. 2, the corresponding friction clips can be rotated, as illustrated in phantom in FIG. 4, until each respective hook member, such as the hook member 74, slidably locks over an adjacent wire tab, such as the tab 64. By means of the releasing end 76, the hook member 74 can be disengaged from the respective tab such as the tab 64. The rack modules can then be separated.

The friction clip 60 can be formed of any resilient plastic or other material which is flexible enough to deform during the locking and unlocking operation, when the rack modules 10a and 10b are being joined or separated, without breaking. The rack module 10 has the further advantage that it is individually free standing and that a plurality of identical racks can be nested or stacked for shipping and storage purposes.

While the clip 60 is shown as being connected to the rack modules 10a and 10b from underneath, it could extend over the top. In addition, the clip 60 can be connected to and extend between any of the shelves.

The rack module 10 can be formed of plastic-coated wire. The wire may be coated with polyethylene or vinyl or any such material which is both durable and corrosion resistant. The coating materials are available in a variety of colors.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An article supporting rack module comprising:
   a first U-shaped supporting frame having two spaced apart, elongated support members; and
   a plurality of elongated shelves affixed to said first frame, extending between said supporting members, and transversely out from said frame, each of said shelves including an article retaining lip for removably retaining the article thereon;
   said plurality of spaced apart, elongated, shelves being affixed to said supporting frame in positions such that articles can be removably supported by said shelves and are removable from an end or over said lip of any said shelves;
   wherein each said lip is elongated and formed in an elongated side of a respective shelf;
   a second U-shaped supporting frame;
   a second plurality of spaced apart, elongated shelves affixed thereto; and
   means for coupling said supporting frames together in back-to-back relationship to form a single rack with said first and second pluralities of shelves extending transversely therefrom on opposite sides of said coupled frames.

2. The organizer as in claim 1 with said U-shaped frame and said shelves comprising coated wire.

3. The article supporting rack module as in claim 1 with said first and second U-shaped supporting frames disposed between said first and said second pluralities of shelves.

* * * * *